INVENTOR.
William D. Bell.
BY
Corbett & Mahoney
ATTORNEYS

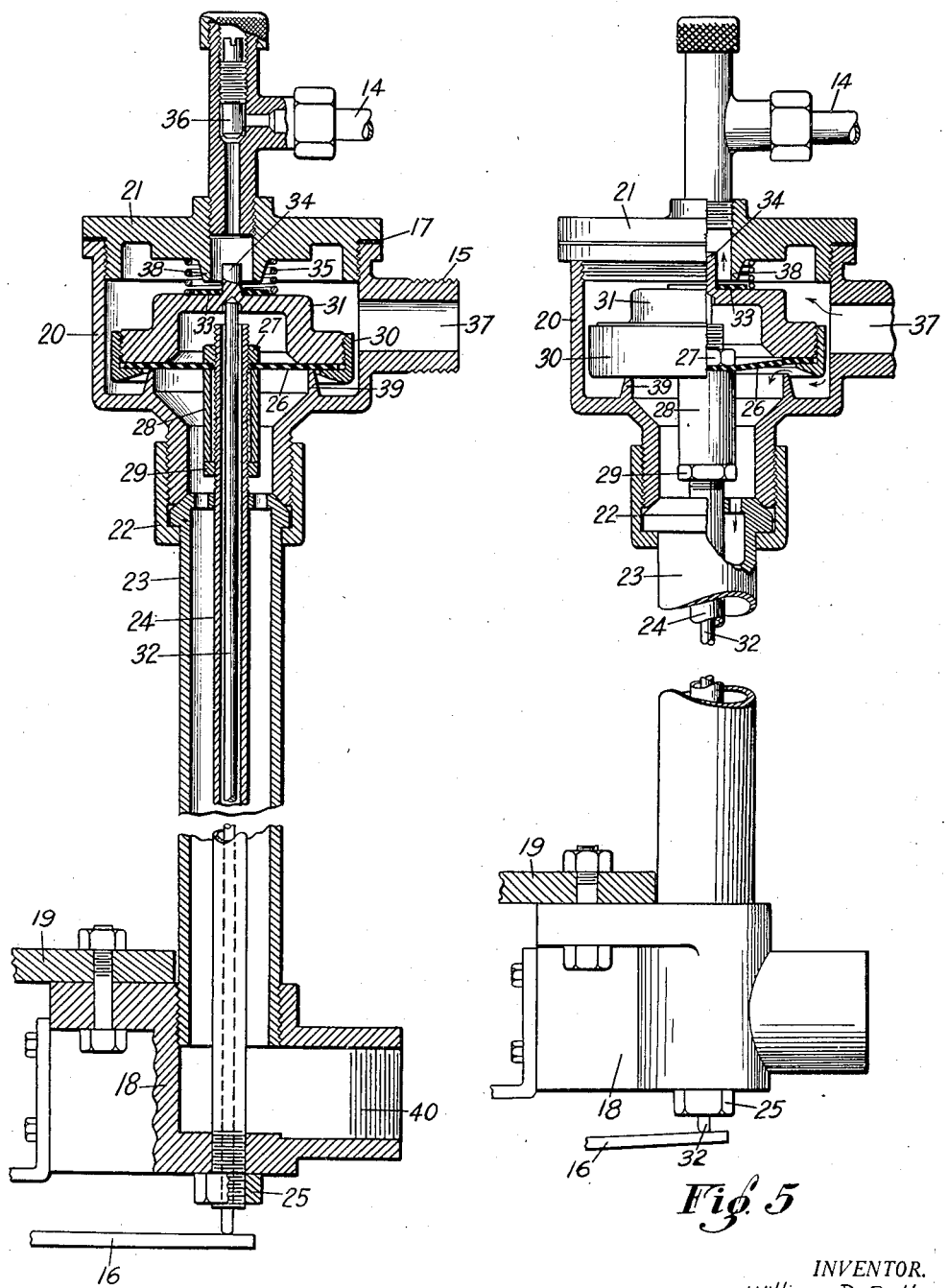

Patented May 9, 1939

2,157,109

UNITED STATES PATENT OFFICE 2,157,109

APPARATUS FOR CONTROLLING FLOW OF FUEL TO A HEATING DEVICE

William D. Bell, Columbus, Ohio, assignor to The Cleveland Heater Company, Cleveland, Ohio Application May 11, 1934, Serial No. 725,204
Renewed July 20, 1937

13 Claims. (Cl. 126—110)

My invention relates to apparatus for controlling flow of fuel to a heating device. It has to do, more particularly, with a fluid fuel control system which is adapted to control the supply of fluid fuel to a heater and which is operated in response to the creation of a current of air in the heater by means of a fan or blower or other suitable means. However, the fluid fuel control system which I have devised is not limited in its application to heaters of this type but is adaptable to other purposes.

In the past, there have been numerous types of control systems devised for controlling the supply of fluid fuel to the main burners of a heater, but these controls have not been entirely satisfactory. In order to ensure a satisfactory degree of safety in the operation of prior art heaters, particularly when the fuel is supplied intermittently, as usually is the case, it is necessary to make use of a main fuel control valve and a so-called safety pilot, which are arranged to coact in such a way that fuel can flow to the main burner, only when an igniting pilot flame is present and when there is an actual demand for heat. Ordinarily, these various functions of controlling and regulating the flow of fuel and the operation of the heater are performed by separate, but interconnected, control elements that are costly and complicated. In the prior art, thermally-actuated fuel control valves have been actuated by changes in the amount of fuel supplied to the activating pilot or to an auxiliary burner. To do this, it has been necessary to make use of a secondary control valve in the pilot supply line, with added costs and complications.

One of the objects of my invention is to provide a fluid control system for heaters of the type indicated which is very simple in structure and which may be manufactured at a small cost.

Another object of my invention is to provide a control system of the type indicated which will be positive in operation, which will be reliable and which will be safe in all respects.

A further object of my invention is to provide means for operating a thermally-actuated fuel control valve in response to the flow of air through a heater without the necessity of employing any additional secondary control elements.

A still further object of my invention is to provide a fluid control system for supplying fluid fuel to a heater of the type indicated wherein the control system will be activated to supply fuel to the heater when, and only when, a current of air is created in said heater by means of a fan or blower or other suitable means.

As indicated, my control system is particularly adaptable to a heater wherein a stream or current of air is created by means of a fan or blower. In its preferred form, I provide a fluid control system which is applied to a heater having means, such as a fan or blower, for forcing air through a passageway, the air being heated in passing through this passageway. I preferably control the fan or blower by means of a room thermostat located in the room to be heated by the heater, although other means may be provided for controlling the fan or blower. The control system which I have devised is of such a type that when the temperature of the room falls below a predetermined degree and the thermostat causes operation of the fan or blower, the control system will operate to cause fuel to be supplied to the main burner of the heater and to be properly ignited. When the room temperature increases above a predetermined degree, the room thermostat will cause the fan or blower to become inoperative and my fluid control system will then operate to cut off the supply of fuel to the main burner.

The preferred embodiment of my invention is shown in the accompanying drawings wherein similar characters of reference designate corresponding parts and wherein:

Figure 4 is a detail in vertical section of the thermally actuated valve and associated parts of my control system showing the valve in closed position.

Figure 5 is a view similar to Figure 4, but showing the valve open.

Figure 1:
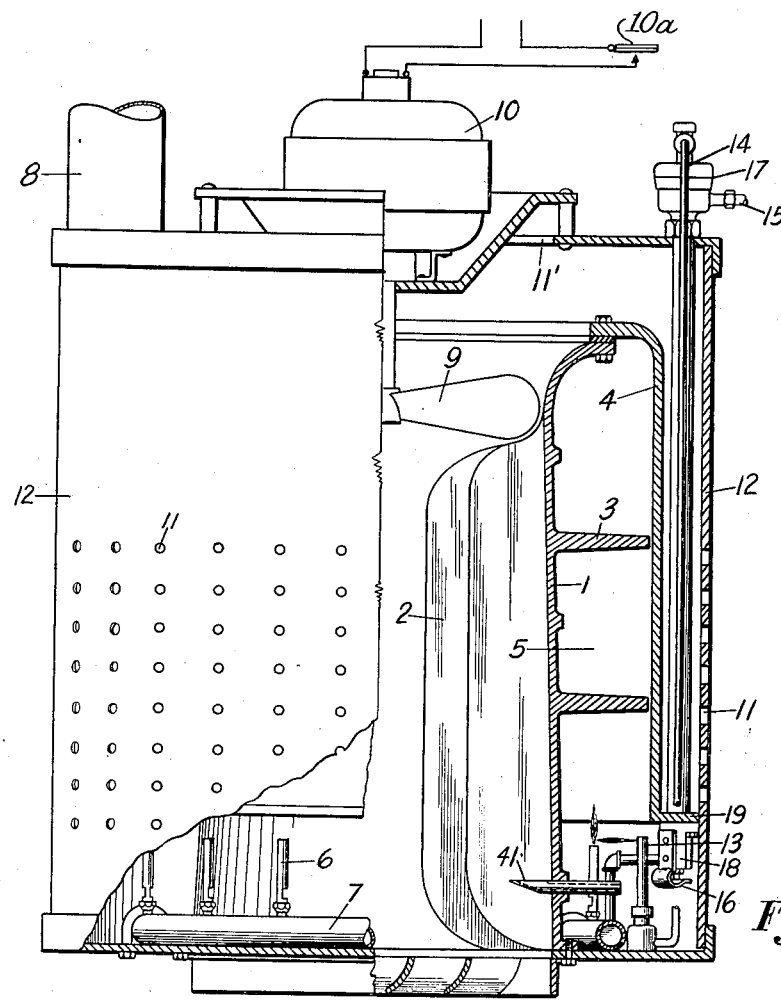
Figure 1 is a side elevation, partly broken away, illustrating a gas-fired space heater of a type to which my control is applicable, showing my control applied thereto.

A very brief description of the heater to which my control system is applied will suffice, since the particular type of heater is immaterial.

The drawings illustrate the application of the control system to what is known as a gas-fired unit heater, consisting in this case of a hollow substantially cylindrical cast-iron core 1 having the integral vertical radiating fins 2 and heat-absorbing flanges 3, and a cast-iron shell 4, the two assembled to form a hollow cylindrical radiator containing an annular combustion space 5 in the lower end of which is located a plurality of bunsen burners 6 on a manifold 7. The flanges 3 are notched or cut away on alternate opposite sides so that the products of combustion in passing upward traverse a tortuous path around the core 1 to the vent pipe 8. A fan 9, driven by an electric motor 10, draws air through perforations 11 in the casing 12 which encloses the radiator and through an annular opening 11 in the top of the heater and discharges it downward through the central core into the space to be heated. The air in its passage through the heater absorbs heat from the shell 4 and the radiating fins 2 of the core 1.

The motor 10 is preferably controlled by a room temperature thermostat indicated at 10a, which starts the motor when the temperature of the room falls below a predetermined point and stops it when the desired temperature is again attained. However, the motor may be controlled in other ways. For this reason it is necessary that fuel be supplied to the heater only during the periods when the motor is in operation, the purpose of this invention being to accomplish this in a simple and positive manner.

Figures 2, 3:
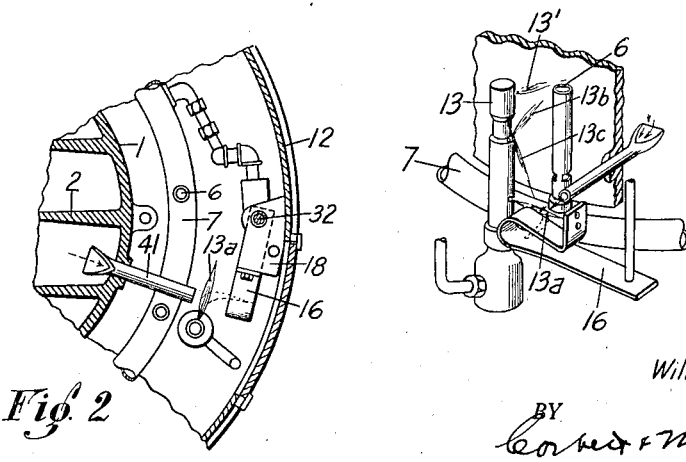
Figure 2 is an enlarged detail in section taken through a portion of the heater and illustrating parts of my control as they are associated with the heater.
Figure 3 is a detail in perspective of the pilot burner, thermostatic element and associated parts of my control.

A pilot 13 fed by means of a by-pass 14 from the main fuel supply line 15, is located within the combustion chamber of the heater adjacent to the main burner, the pilot flame in this case burning in several jets in order to properly ignite the main burner and to supply heat for the operation of the thermal element 16 of the main control valve 17, (Figure 3). One of the jets 13' of flame of the pilot 13 extends slightly over the top of one of the Bunsen burners 6 and another 13a extends horizontally from the lower part of the pilot burner alongside the thermal element 16. However, this jet 13a normally does not impinge the element 16 but is spaced therefrom slightly. Another jet 13b projects upwardly at an angle across the path of jet 13' and a further jet 13c projects downwardly at an angle across the path of jet 13a to insure that jet 13' and 13a will always be ignited.

As stated, the control valve 17, shown in detail in Figures 4 and 5, is so located that its thermal element 16 is positioned adjacent to the pilot burner 13, being supported by the fitting 18 bolted to the flange 19 of the radiator shell 4.

The control valve consists of the valve body 20, and the threaded valve cap 21, supported in the heater by the threaded coupling 22 and the extension tube 23 threaded into the fitting 18 at the combustion chamber of the heater.

The lower end of a central tube 24 is threaded into the fitting 18 and secured in its proper position by means of the lock nut 25, the upper end passing through the center of the flexible diaphragm 26 to which it is rigidly attached by means of the clamping nut 27, the threaded sleeve 28, and the lock nut 29, all threaded onto the upper end of tube 24.

The outer edge of the circular diaphragm 26 is clamped by means of the flanged threaded collar 30 to the valve disc 31. A rod 32 passes through the central tube 24, its lower end resting upon the free ends of the thermal element 16 and its upper end in a recess within the valve disc 31, in such a manner that movement of the free end of the thermal element 16 will be transmitted to the valve disc 31 and to the edge or outer portion of the diaphragm 26.

On the upper side of the valve disc 31 a composition disc 33 is held in central position by the projecting stem 34, and a spring 35 is interposed between the valve disc 31 and the valve cap 21.

A needle valve 36 threaded into the valve cap 21 controls the flow of gas through the by-pass 14 to the pilot 13.

The thermal element 16 in this case consists of a formed strip of bimetallic material attached to the fitting 18, its free end supporting the lower end of the valve rod 32. This thermal element is so formed that its free end rises or moves toward the valve body when heated.

Fuel is admitted to the interior of the valve 20 from the main gas line through the passageway 37, passes between the composition disc 33 and the pilot valve seat 38, through the needle valve 36 and tube 14 to the pilot 13. Normally, when the thermal element 16 is cold, the diaphragm 26 seats gas-tight against the valve seat 39 and gas cannot flow through the valve to the main burner. When the thermal element is heated in the manner that will be presently described, the free end of the element 16 will move upward, carrying with it the rod 32 and the valve disc 31, which will lift the outer edge of the diaphragm 26 away from the seat 39 as indicated in Figure 5, permitting gas to flow through the valve, through the tube 23 to the fitting 18, and through the passage 40 to the main burner of the heater.

I have provided a tube or blast pipe 41, (Figure 1), one end of which projects through the wall of the combustion chamber into the path of the air stream from the fan 9, the location of the pilot and of the other end of the blast tube being such that a jet of air issuing from the tube 41 will pass through the pilot flame 13a and cause it to impinge upon the thermal element 16. The other end of this member is preferably scoop-shaped so as to more readily collect a portion of the air forced through the heater. However, the scoop-shaped portion need not necessarily be provided because the pressure of the air within casing 1 will be much greater than that at the outside of the casing and, consequently, the air will readily flow through tube 41.

Although I state that the pilot flame impinges on the thermal element 16, it will be apparent that it need not necessarily actually touch the thermal element 16 in order to affect it. When the air current comes through tube 41 and strikes the jet of flame, it bends it closer to the thermal element and in some instances causes it to actually touch the element. However, even if the flame does not actually touch the thermal element 16, the air which passes through the flame is heated, and the hot air heats the thermal element.

In the operation of the heater, gas is normally admitted to the valve 20 through the connection 37, flows through the needle valve 36, is lighted at the pilot 13 where it burns in several jets, one of which, 13a, is adjacent to but normally not affecting the thermal element 16. This thermal element being cold, the valve disc 31 is seated against the seat 39 by the spring 35 and gas cannot flow to the main burner.

When the temperature of the room falls below a desired degree, the room thermostat causes the motor 10 to start the fan 9, which will force air downward through the heater, passing the open end of the blast tube 41. A small portion of this air will be diverted and issue as a jet from the tube 41 upon the pilot flame 13a, bending or distorting the pilot flame to such an extent that it will impinge upon the thermal element 16 and causing it to become heated. As the thermal element is heated its free end rises, carrying with it the valve rod 32 and the valve disc 31, lifting the outer edge of the diaphragm 26 for its contact with the seat 39, permitting gas to flow to the main burner or burners shown in Figure 5, which is ignited by the pilot flame.

As the operation of the heater continues the temperature of the thermal element continues to rise until the valve disc 31 is moved upward to such an extent that the composition disc 33 tends to seat against the pilot valve seat 38. This action restricts flow of gas to the pilot and prevents overheating of the thermal element 16.

In some instances the disc 33 may seat on the valve seat 38, and the pilot burner may go out but this will only be for an instant because the thermal element 16 will then cool and the disc 33 will again be unseated.

When the motor 10 is stopped, the flow of air through the blast tube 41 stops, the pilot flame is no longer distorted but resumes its normal burning so that it no longer affects the thermal element 16 which immediately cools and permits the spring 35 to close the valve against the seat 39, thus shutting off the supply of gas to the main burners.

From the foregoing it will be seen that this invention permits the complete control of a heater of the type described by means of a thermally-actuated valve alone, a pilot flame supplying the energy required for the operation of the main fuel valve when and only when air is flowing through the heater. The operation of the main fuel control valve requires the presence of an igniting pilot flame. It also depends upon the presence of a flow of air through the heater, so that the heater will be protected from damage in the event of motor failure.

In the following claims I state that the pilot flame impinges the thermostatic element, when the blast of air is directed against it. However, as previously stated, the flame may not actually touch the thermal element when the blast of air is forced through it, but even if it does not actually touch the thermal element, such element will be heated thereby. I intend to cover either of the conditions indicated by the term "impinging".

Having thus described my invention, what I claim is:

1. In a fluid fuel control system, a main burner, a source of fuel supply for said main burner, a valve for controlling supply of fuel to said main burner, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element and having a jet of flame which normally does not impinge upon said thermostatic element, and means for delivering a jet of air against the jet of flame of said auxiliary burner to bend it so that it will impinge upon said thermostatic element causing it to be heated and to actuate said valve in order to permit fuel to be supplied to said main burner.

2. In combination with a heater of the type described embodying means for forcing air through the heater and a main burner for heating said air, a source of fuel supply for said main burner, a valve for controlling supply of fuel to said main burner, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element and having a jet of flame which normally does not impinge upon said thermostatic element, and means operated by the air flowing through said heater for causing the jet of flame of said auxiliary burner to impinge upon said thermostatic element causing it to be heated and to actuate said valve in order to permit fuel to be supplied to said main burner.

3. In combination with a heater of the type described embodying a passageway through which air to be heated is adapted to pass and a main burner for heating said air, a source of fuel supply for said main burner, a fuel control system for controlling the supply of fuel to the main burner of said heater, said fuel control system comprising a main valve, a thermostatic element for actuating said valve, a constantly burning auxiliary burner having a jet of flame disposed in position to ignite the main burner when fuel is supplied thereto, means for supplying fuel to said auxiliary burner, said auxiliary burner being located adjacent said thermostatic element and having an auxiliary jet of flame which normally does not impinge upon said thermostatic element, means for forcing air through said passageway of said heater, and means for receiving a portion of said air and discharging it in a jet against said last-named auxiliary jet of flame causing it to bend and to impinge upon said thermostatic element in order that it will be heated and will actuate said valve to permit fuel to be supplied to said main burner.

4. In combination with a heater of the type described embodying a passageway through which air to be heated is adapted to pass and a main burner for heating said air, a source of fuel supply for said burner, a fuel control system for controlling the supply of fuel to the main burner of said heater, said fuel control system comprising a main valve, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element and having a jet of flame which normally does not impinge upon said thermostatic element, means for forcing air through said passageway of said heater, means for receiving a portion of said air and discharging it in a jet against said jet of flame causing it to bend and to impinge upon said thermostatic element in order that it will be heated and will actuate said valve to permit fuel to be supplied to said main burner, and means for decreasing the amount of fuel supplied to said auxiliary burner after the main valve is actuated.

5. In combination with a heater of the type described embodying a passageway through which the air to be heated is adapted to pass and a main burner for heating said air, a source of fuel supply for said main burner, a fuel control system for controlling the supply of fuel to the main burner of said heater, said fuel control system comprising a main valve, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element and having a jet of flame which normally does not impinge upon said thermostatic element, means for forcing air through said passageway of said heater, means for receiving a portion of said air and discharging it in a jet against said jet of flame causing it to bend and to impinge upon said thermostatic element in order that it will be heated and will actuate said valve to permit fuel to be supplied to said main burner, and means for automatically controlling the means for forcing air through said passageway in accordance with the temperature in the room where said heater is located.

6. In a fluid fuel control system, a main burner, a source of fuel supply for said burner, a valve for controlling supply of fuel to said main burner, a thermal element for actuating said valve, a constantly burning auxiliary burner disposed in position to ignite the main burner when fuel is supplied thereto, means for supplying fuel to said auxiliary burner, said auxiliary burner being located adjacent said thermal element in such a manner that the flame thereof normally does not affect said thermal element, and forced air means for causing the flame of said auxiliary burner to affect said thermal element and to cause it to actuate said valve in order to permit fuel to be supplied to said main burner, said forced air means being operable independently of the means for supplying fuel to said auxiliary burner.

7. In a fluid fuel control system, a main burner, a source of fuel supply for said main burner, a valve for controlling supply of fuel to said main burner, a thermal element for actuating said valve, a constantly burning auxiliary burner disposed in position to ignite the main burner when fuel is supplied thereto, means for supplying fuel to said auxiliary burner, said auxiliary burner being located adjacent said thermal element in such a manner that the flame thereof normally does not affect said thermal element, forced air means for causing the flame of said auxiliary burner to affect said thermal element and to cause it to actuate said valve in order to permit fuel to be supplied to said main burner, said forced air means being operable independently of the means for supplying fuel to said auxiliary burner, and means for decreasing the amount of fuel supplied to said constantly burning auxiliary burner after said valve is actuated.

8. In a fluid fuel control system, a main burner, a source of fuel supply for said main burner, a valve for controlling supply of fuel to said main burner, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element in such a manner that the flame thereof normally does not impinge upon said thermostatic element, and forced air means for causing the flame of said auxiliary burner to impinge upon said thermostatic element causing it to be heated and to actuate said valve in order to permit fuel to be supplied to said main burner, said forced air means being operable independently of the means for supplying fuel to said auxiliary burner.

9. In a fluid fuel control system, a main burner, a source of fuel supply for said main burner, a valve for controlling supply of fuel to said main burner, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element in such a manner that the flame thereof normally does not impinge upon said thermostatic element, forced air means for causing the flame of said auxiliary burner to impinge upon said thermostatic element causing it to be heated and to actuate said valve in order to permit fuel to be supplied to said main burner, said forced air means being operable independently of the means for supplying fuel to said auxiliary burner, and means for decreasing the amount of fuel supplied to said constantly burning auxiliary burner after said valve is actuated.

10. In a fluid fuel control system, a main burner, a source of fuel supply for said main burner, a valve for controlling supply of fuel to said main burner, a thermostatic element for actuating said valve, a constantly burning auxiliary burner disposed in position to ignite the main burner when fuel is supplied thereto, means for supplying fuel to said auxiliary burner, said auxiliary burner being located adjacent said thermostatic element in such a manner that the flame thereof normally does not impinge upon said thermostatic element, and forced air means for causing the flame of said auxiliary burner to bend so that it will impinge upon said thermostatic element causing it to be heated and to actuate said valve in order to permit fuel to be supplied to said main burner.

11. In a heater of the type described, burner means, fuel supply means, air circulating means, and fuel control means comprising a control valve in said fuel supply, thermostatic means for actuating said valve, and an ignition burner for said main burner, said ignition burner being located adjacent said thermostatic means but in such position that the normal condition of the flame thereof does not affect said thermostatic means, and means depending upon said air circulating means operating to cause an abnormal condition in said ignition burner so that the latter directly affects said thermostatic means to actuate said valve.

12. In a heater of the type described, a fan, a fuel supply, a control device in said fuel supply, means including ignition means and thermal responsive means associated operatively with said control device for cutting off the fuel supply, and means actuated by the air created by said fan for effecting heat transfer relation between said ignition means and said thermal means operating to maintain said fuel control means in open position and to effect the cutting off of said fuel supply upon stoppage of said fan.

13. In combination, a circulating heater having an air circulating element, burner means, fluid fuel supply means for said burner, and a flame controlled thermostatic device including a flame element and a thermostatic element controlling the supply of fuel to said burner, said thermostatic device including means responsive to circulation of air for effecting heat transfer relation between the flame element and the thermostatic element thereof whereby said thermostatic device is operated to control the fuel supply through direct action of such circulation of air.

WILLIAM D. BELL.